(12) United States Patent
Koshiji et al.

(10) Patent No.: US 11,350,244 B2
(45) Date of Patent: May 31, 2022

(54) INFORMATION DELIVERY APPARATUS, INFORMATION DELIVERY METHOD AND PROGRAM

(71) Applicant: Nippon Telegraph and Telephone Corporation, Tokyo (JP)

(72) Inventors: Kojun Koshiji, Tokyo (JP); Naoki Higo, Tokyo (JP); Toshimitsu Tsubaki, Tokyo (JP); Masanao Nakano, Tokyo (JP); Tatsuya Ishihara, Tokyo (JP); Yoshiko Sueda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/251,640

(22) PCT Filed: May 14, 2019

(86) PCT No.: PCT/JP2019/019081
§ 371 (c)(1),
(2) Date: Dec. 11, 2020

(87) PCT Pub. No.: WO2019/239768
PCT Pub. Date: Dec. 19, 2019

(65) Prior Publication Data
US 2021/0266705 A1  Aug. 26, 2021

(30) Foreign Application Priority Data
Jun. 12, 2018  (JP) .............................. JP2018-112070

(51) Int. Cl.
*H04W 4/02* (2018.01)
*H04W 4/029* (2018.01)

(52) U.S. Cl.
CPC ........... *H04W 4/029* (2018.02); *H04W 4/025* (2013.01)

(58) Field of Classification Search
CPC .............................. H04W 4/029; H04W 4/025
(Continued)

(56) References Cited

U.S. PATENT DOCUMENTS

2013/0226857 A1* 8/2013 Shim ..................... H04W 4/029
706/52
2014/0115146 A1 4/2014 Johnson et al.
(Continued)

FOREIGN PATENT DOCUMENTS

JP  2002-359649  12/2002
JP  2017-142811  8/2017

OTHER PUBLICATIONS

Takahashi et al., "A Pedestrian Navigation System using Interactive Digital Signage System and Mobile Phone," Information Processing Society of Japan Research Report, Mar. 16, 2007, pp. 71-78, 17 pages (with English Translation).
(Continued)

*Primary Examiner* — Ted M Wang
(74) *Attorney, Agent, or Firm* — Fish & Richardson P.C.

(57) ABSTRACT

An information delivery technique for, at the time of delivery of area information via a network, delivering area information about a destination before a device arrives at the destination is disclosed. One aspect of the present disclosure is an information delivery apparatus including a delivery information management function unit configured to manage area information to be delivered, a destination management function unit configured to manage a destination of a device, and a communication function unit configured to deliver the area information to the device, wherein the destination management function unit determines the destination of the device using movement information about the device, and the communication function unit delivers area
(Continued)

information about the destination to the device before the device moves to the destination.

19 Claims, 8 Drawing Sheets

(58) Field of Classification Search
USPC .................................................... 455/456.1
See application file for complete search history.

(56) References Cited

U.S. PATENT DOCUMENTS

2016/0180394 A1    6/2016   Tseng
2016/0323159 A1*   11/2016   Leblanc ................. G06F 16/29

OTHER PUBLICATIONS

Tsuchiya et al., "Location-sensitive Itinerary-based Passenger Information System," IEEJ Trans. IA, 2005, 125(4):338-347, 26 pages (with English Translation).

* cited by examiner

INFORMATION DELIVERY APPARATUS, INFORMATION DELIVERY METHOD AND PROGRAM

CROSS-REFERENCE TO RELATED APPLICATIONS

This application is a National Stage application under 35 U.S.C. § 371 of International Application No. PCT/JP2019/019081, having an International Filing Date of May 14, 2019, which claims priority to Japanese Application Serial No. 2018-112070, filed on Jun. 12, 2018. The disclosure of the prior application is considered part of the disclosure of this application, and is incorporated in its entirety into this application

TECHNICAL FIELD

The present disclosure relates to an information delivery system, and more particularly to an information delivery system in which an application server built on a cloud or the like delivers information about a destination to a moving device.

BACKGROUND ART

There has been a widely used information delivery service in which an application server built on a cloud or the like delivers information about an area where a device is present (information beneficial to the user such as an advertisement or a transfer guide) to the device, using Global Positioning System (GPS) information about the device, or the like.

As a delivery technique for implementing such a service, two main types of approaches have been studied. The first approach is a pull-type scheme in which when a device arrives at a target area, "arrival at the area" and "information that the device wants" are notified to an application server, and area information is downloaded from the application server. The second approach is a push-type scheme in which an application server manages device movement information and delivers area information to the device.

As one of the pull delivery schemes, Non Patent Literature 1 proposes a technology in which when delivering area information to a device, an application server also delivers information for navigating the device user to a location intended by the application server so as to guide the device, and further delivers, in advance, information about the location to which the device is to be navigated.

Further, as one of the push delivery schemes, Non Patent Literature 2 proposes a technology of automatically delivering guidance information suitable for a user's situation to a user who uses public transportation (mainly, train) on the basis of the user's movement route and current location.

CITATION LIST

Non Patent Literature

Non Patent Literature 1: "A Pedestrian Navigation System: using Interactive Digital Signage System and Mobile Phone", Ikuko Takanashi, Yuko Suganuma, Satoshi Hisanaga, Atsushi Tanaka, Satoshi Tanaka, Research Report of Information Processing Society of Japan 2007-ITS-28 (10), 2009

Non Patent Literature 2: "Location-sensitive Itinerary-based Passenger Information System", Takashi Tsuchiya, Akihiko Matsuoka, Takahiko Ogino, Koichi Goto, Hisao Nakao, Hajime Takebayashi, IEEJ Trans. IA, Vol. 125, No. 4, 2005

SUMMARY OF THE INVENTION

Technical Problem

In any of the conventional techniques described above, the device receives the area information after arrival at the destination. In other words, Non Patent Literature 1 describes that the information about the location to which the device is to be navigated is delivered in advance, but does not contemplate the case where the device moves to any area other than the area to which the device is to be navigated. In the scheme disclosed in Non Patent Literature 2 at the time of arrival of the user at a destination, an optimum movement path corresponding to the user's final destination is re-calculated, and area information about a next destination (in Non Patent Literature 2, information about means for moving from the destination to the next destination, such as a transfer guide) is delivered. The area information is delivered at the timing of arrival of the device at the destination.

However, it is likely that such delivery information is more beneficial to the user only when the information can be delivered before the device arrives at the destination. For example, in the case of delivering, as the area information, information that supports the driving of personal mobility such as an electric vehicle, a time lag can occur if the personal mobility begins to receive the area information after arriving at the area, thereby interfering with smooth movement of the personal mobility.

To solve such problems, a method where the device holds all area information in advance, and quickly reads the related area information at the time of arrival at the destination can be considered. However, this solution can be applied to only multi-function and high-performance devices such as personal mobility, but cannot be easily applied to single-function and low-performance devices, which prevents lowering the prices of the devices.

In view of the problems described above, an object of the present disclosure is to provide an information delivery technique in which at the time of delivery of area information via a network, area information about a destination is delivered before a device arrives at the destination.

Means for Solving the Problem

In order to solve the above problem, one aspect of the present disclosure is an information delivery apparatus including a delivery information management function unit configured to manage area information to be delivered, a destination management function unit configured to manage a destination of a device, and a communication function unit configured to deliver the area information to the device, wherein the destination management function unit determines the destination of the device using movement information about the device, and the communication function unit delivers area information about the destination to the device before the device moves to the destination.

Effects of the Invention

According to the present disclosure, at the time of delivery of area information via a network, area information about a destination can be delivered before the device arrives at the destination.

DESCRIPTION OF EMBODIMENTS

Hereinafter, an embodiment of the present disclosure will be described with reference to the drawings.

In the following example, a proactive delivery device for delivering area information about a destination of a device is disclosed. The proactive delivery device according to the example described below is an information delivery apparatus that grasps a destination of a device in advance using movement information such as a movement path and a movement history of the device, and delivers area information about the destination to the device before the device arrives at the destination.

Figure 1:
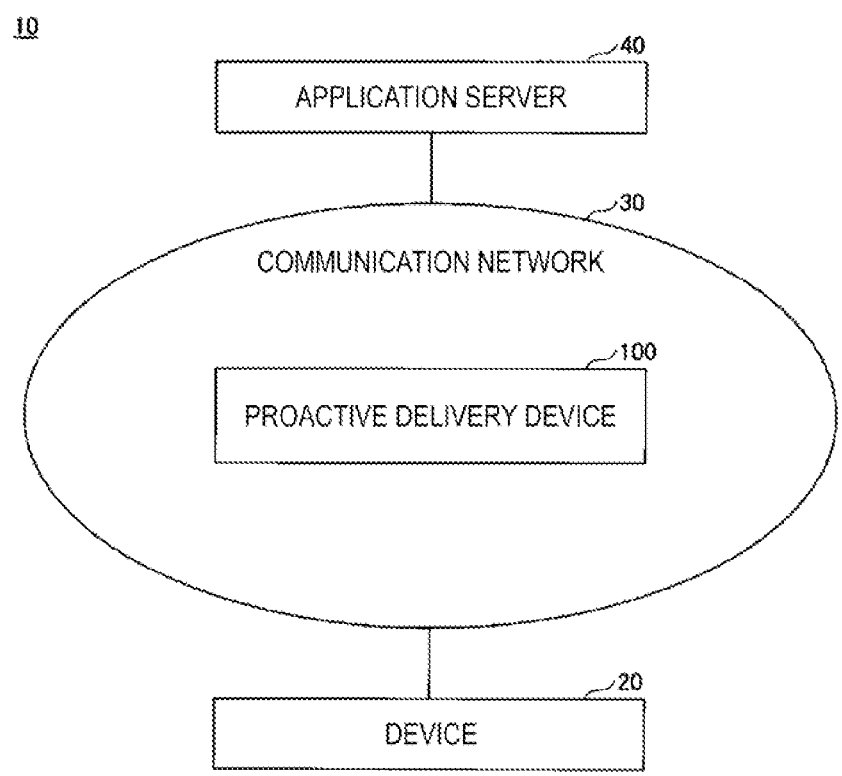
FIG. 1 is a block diagram illustrating an overall configuration of a communication system according to an example of the present disclosure.

First, a communication system according to an example of the present disclosure will be described with reference to FIG. 1. FIG. 1 is a block diagram illustrating an overall configuration of the communication system according to the example of the present disclosure.

As illustrated in FIG. 1, the communication system 10 includes a device 20, a communication network 30, an application server 40, and a proactive delivery device 100, and serves as an information delivery system that delivers information to the user's device 20. As illustrated, the device 20 transmits and receives information to and from the application server 40 via the communication network 30 that includes the proactive delivery device 100.

The device 20 is a mobile device, typically such as a mobile phone, smartphone, tablet, wearable device, navigation device or on-vehicle device, that receives area information from the application server 40. As illustrated, the device 20 includes a positioning function of detecting the location of the device 20, such as a GPS function, and communicates with the application server 40 (in a wireless and/or wired manner) via the communication network 30.

The communication network 30 is a communication network that supports a communication scheme such as a Transmission Control Protocol/Internet Protocol (TCP/IP) protocol stack. For example, the communication network 30 supports wireless and/or wired communication and enables communication of various information between the device 20 and the application server 40 by communicatively connecting with user devices such as the device 20, various servers such as the application server 40, network devices, and the like.

The application server 40 provides an application that delivers area information about each area to the device 20. Typically, the application server 40 is built on a cloud or the like and is provided by a service provider. The application server 40 communicates with the device 20 via the communication network 30 and the proactive delivery device 100.

Figure 2:
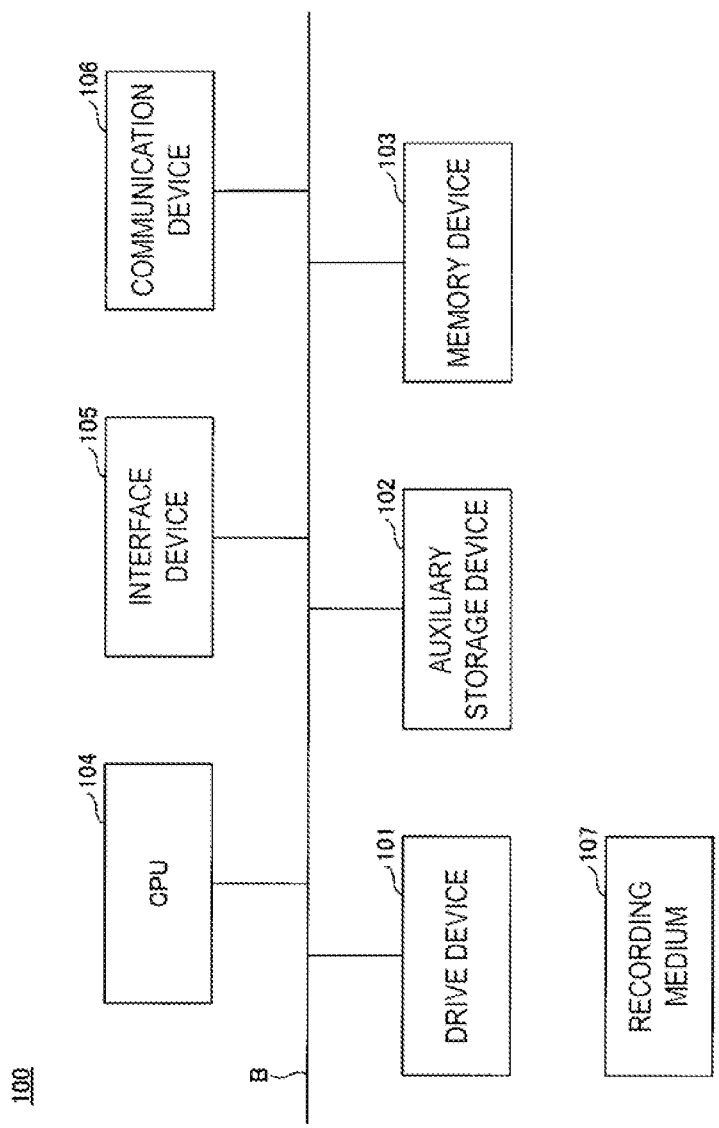
FIG. 2 is a block diagram illustrating a hardware configuration of a proactive delivery device according to the example of the present disclosure.

As described in detail below, the proactive delivery device 100 delivers the area information received from the application server 40 to the device 20. The proactive delivery device 100 is typically achieved by a server and may have a hardware configuration as illustrated in FIG. 2. That is, the proactive delivery device 100 includes a drive device 101, an auxiliary storage device 102, a memory device 103, a Central Processing Unit (CPU) 104, an interface device 105, and a communication device 106. These components are connected to each other via a bus B.

Various computer programs including programs for implementing below-mentioned various functions and processing in the proactive delivery device 100 may be provided from a recording medium 107 such as a Compact Disk-Read Only Memory (CD-ROM). When the recording medium 107 that stores the programs is set in the drive device 101, the programs are installed in the auxiliary storage device 102 from the recording medium 107 through the drive device 101. However, the programs are not necessarily installed from the recording medium 107 and may be downloaded from another external device via a network or the like. The auxiliary storage device 102 stores the installed programs and stores necessary files, data, and the like. In response to an instruction to start up the programs, the memory device 103 reads the programs and data from the auxiliary storage device 102, and stores them. The CPU 104 that functions as a processor executes various functions and processing of the proactive delivery device 100 according to the programs and various kinds of data, such as parameters required to execute the programs, which are stored in the memory device 103. The interface device 105 is used as a communication interface for connection to the network or external device. The communication device 106 executes various kinds of communication processing for communicating with the terminal or external device. The proactive delivery device 100 is not limited to the hardware configuration described above and may be achieved by any another appropriate hardware configuration.

Figure 3:
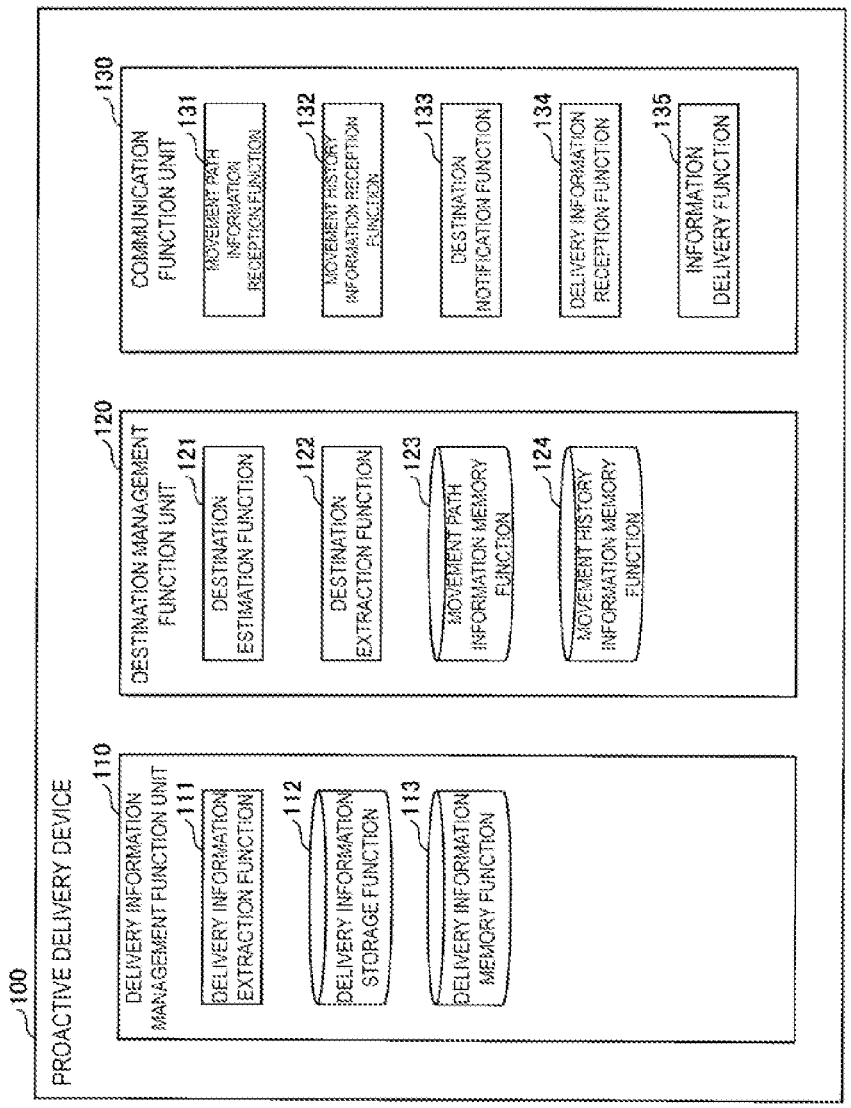
FIG. 3 is a block diagram illustrating a functional configuration of the proactive delivery device according to the example of the present disclosure.

Next, the proactive delivery device 100 according to the example of the present disclosure will be described with reference to FIG. 3. FIG. 3 is a block diagram illustrating a functional configuration of the proactive delivery device 100 according to the example of the present disclosure.

As illustrated in FIG. 3, the proactive delivery device 100 includes a delivery information management function unit 110, a destination management function unit 120, and a communication function unit 130. Note that the proactive delivery device 100 according to the present disclosure is not limited to the function/configuration described above, and does not exclude other functions/configurations. Furthermore, from the perspective of implementation, the proactive delivery device 100 need not be achieved as a single device, node, or the like, and is not constrained in terms of implementation and, for example, may be achieved by multiple devices.

The delivery information management function unit 110 manages information to be delivered to the device 20. The delivery information management function unit 110 includes a delivery information extraction function 111, a delivery information storage function 112, and a delivery information memory function 113.

The delivery information extraction function 111 extracts information to be delivered to the device 20 (for example, area information indicating information about each area) from the delivery information memory function 112.

The delivery information storage function 112 stores delivery information (area information) received from the application server 40 in the delivery information memory function 113. Specifically, the delivery information storage function 112 receives the delivery information received by the delivery information reception function 134 from the application server 40, and stores the received delivery information in the delivery information memory function 113.

The delivery information memory function 113 stores the information to be delivered to the device 20. Specifically, the information to be delivered is provided from the application server 40, and in the present example, includes area information about geographic areas (for example, public facility information, traffic information, shop information, weather information, disaster information in the areas).

The destination management function unit 120 manages the movement path of the device 20. The destination management function unit 120 includes a destination estimation function 121, a destination extraction function 122, a movement path information memory function 123, and a movement history information memory function 124.

The destination estimation function 121 estimates an area to which the device 20 moves next using the movement history of the device 20 when the movement path of the device 20 is unknown (for example, when the device 20 does not determine the movement path in advance). The estimation processing will be described below.

The destination extraction function 122 extracts an area to which the device 20 moves next from the movement path information memory function 123 when the movement path of the device 20 is known (for example, when the device 20 determines the movement path in advance). For example, when the device 20 is executing navigation to a destination set by the user, the movement path information may indicate a movement path from a starting point to the destination during the navigation.

The movement path information memory function 123 stores the movement path information about the device 20 when the movement path of the device 20 is known, and stores the destination of the device, which is estimated by the destination estimation function 121, or the movement path to the destination when the movement path of the device 20 is unknown.

The movement history information memory function 124 stores movement history information received by the communication function unit 130. The movement history information includes "source information" indicating an area from which the device 20 has moved, "destination information" indicating an area to which the device 20 has moved from the previous area, and attribute information such as the type, the movement speed, and the user information about device 20.

The communication function unit 130 controls communication (including wireless communication and/or wired communication) with external devices including the proactive delivery device 100 and the device 20. The communication function unit 130 includes a movement path information reception function 131, a movement history information reception function 132, a destination notification function 133, a delivery information reception function 134, and an information delivery function 135.

The movement path information reception function 131 receives the movement path information about the device 20 from the device 20 when the movement path of the device 20 is known.

The movement history information reception function 132 receives the movement history information to be utilized to estimate the area to which the device 20 moves next when the movement path of the device 20 is unknown.

The destination notification function 133 sends the destination information about the device 20, which is acquired from the destination estimation function 121 and/or the destination extraction function 122, to the application server 40.

The delivery information reception function 134 receives delivery information (area information) from the application server 40, and passes the received delivery information to the delivery information management function unit 110. Specifically, the delivery information reception function 134 receives the area information corresponding to the destination information notified by the destination notification function 133 to the application server 40.

The information delivery function 135 delivers the information (for example, area information) acquired from the delivery information extraction function 111 to the device 20.

Figure 4:
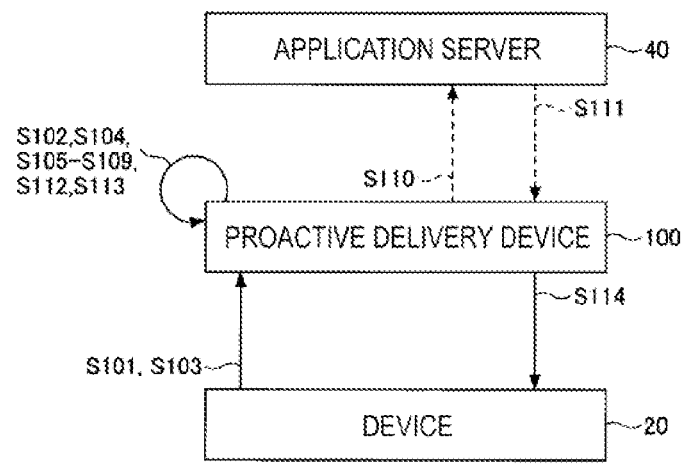
FIG. 4 is a flowchart illustrating information delivery processing according to the example of the present disclosure.

Next, information delivery processing executed by the proactive delivery device 100 according to the example of the present disclosure will be described with reference to FIGS. 4 to 8. FIG. 4 is a flowchart illustrating the information delivery processing according to the example of the present disclosure.

Figure 5:
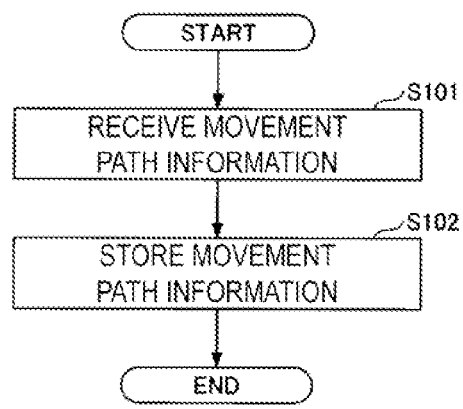
FIG. 5 is a flowchart illustrating movement path information storage processing according to the example of the present disclosure.

As illustrated in FIG. 4, in step S101, when the movement path of the device 20 is known, the movement path information reception function 131 receives movement path information from the device 20. Specifically, as illustrated in FIG. 5, in step S101, the movement path information reception function 131 receives the movement path information. The movement path information is received from the device 20 in the present example, but the present example is not limited thereto. The movement path information reception function 131 may receive the movement path information from other mechanisms such as the application server 40.

In step S102, the movement path information memory function 123 stores the received movement path information. Specifically, as illustrated in FIG. 5, in step S102, the movement path information memory function 123 stores the received movement path information.

Figure 6:
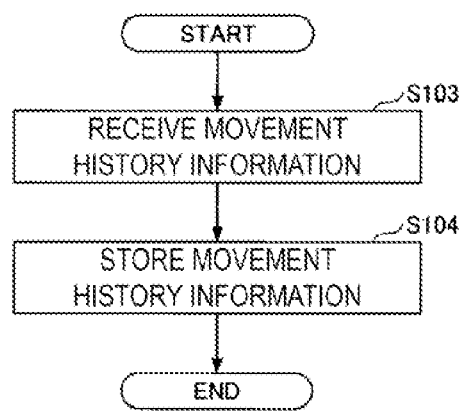
FIG. 6 is a flowchart illustrating movement history storage processing according to the example of the present disclosure.

In step S103, when the movement path of the device 20 is unknown, the movement history information reception function 132 receives the movement history information from the device 20. Specifically, as illustrated in FIG. 6, in step S103, the movement history information reception function 132 receives the movement history information from the device 20. The movement history information is received from the device 20 in the present example, but the present example is not limited thereto. The movement history information reception function 132 may receive storage information or position registration information about the device 20, which is held by other mechanisms including the application server 40, a network device configuring the communication network 30 such as a wireless base station.

In step S104, the movement history information memory function 124 stores the received movement history information. Specifically, as illustrated in FIG. 6, in step S104, the movement history information memory function 124 stores the received movement history information.

Figure 7:
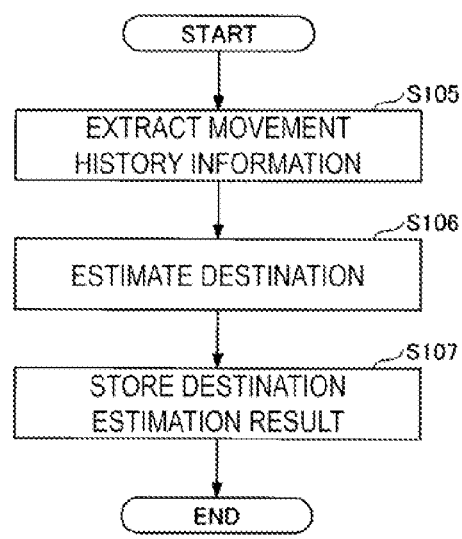
FIG. 7 is a flowchart illustrating destination estimation processing according to the example of the present disclosure.

In step S105, when the movement path of the device 20 is unknown, the destination estimation function 121 extracts the movement history information about the device 20 the destination of which is to be estimated. The movement history information may be extracted using attributes such as the type and the movement speed of the device 20. Specifically, as illustrated in FIG. 7, in step S105, the destination estimation function 121 extracts the movement history information from the movement history information memory function 124.

In step S106, the destination estimation function 121 estimates the destination of the device 20 based on the extracted movement history information. Specifically, as illustrated in FIG. 7, the destination estimation function 121 estimates the destination of the device 20 based on the movement history information.

As a specific example of the estimation processing, given that the device 20 continues to move while keeping the same traveling direction as the direction in which the device has entered the current area, the destination estimation function 121 may estimate an area located ahead in the traveling direction as a next area. The destination estimation function 121 may also use map information to estimate, as a next area, an area located ahead in the traveling direction of the device 20 moving on a road, rail, or the like.

As another example, the destination estimation function 121 may utilize a machine learning technique to classify the movement history information about the device acquired in advance and determine the destination of the device 20. For example, the movement history information containing attribute information such as the types, movement speeds, and user information of a large number of devices is used as input data, learning data in which the destination or next area of each of the devices is output as output data is prepared in advance, and a learning model such as a neural network is learned using the prepared learning data. The destination estimation function 121 may use the acquired learned model to estimate the destination or next area based on the extracted movement history information. This is based on the assumption that users or devices having similar attributes and/or movement histories tend to move toward similar destinations.

In addition, the following methods may be adopted: a method of extracting an area to which the device/user is most likely to move; a method of extracting all areas to which the device/user is likely to move; and a method of extracting a predetermined number of areas to which the device/user is more likely to move next in decreasing order.

In step S107, the movement path information memory function 123 stores the destination estimation result as the movement path information. Specifically, as illustrated in FIG. 7, in step S107, the movement path information memory function 123 stores the destination estimation result as the movement path information.

Figure 8:
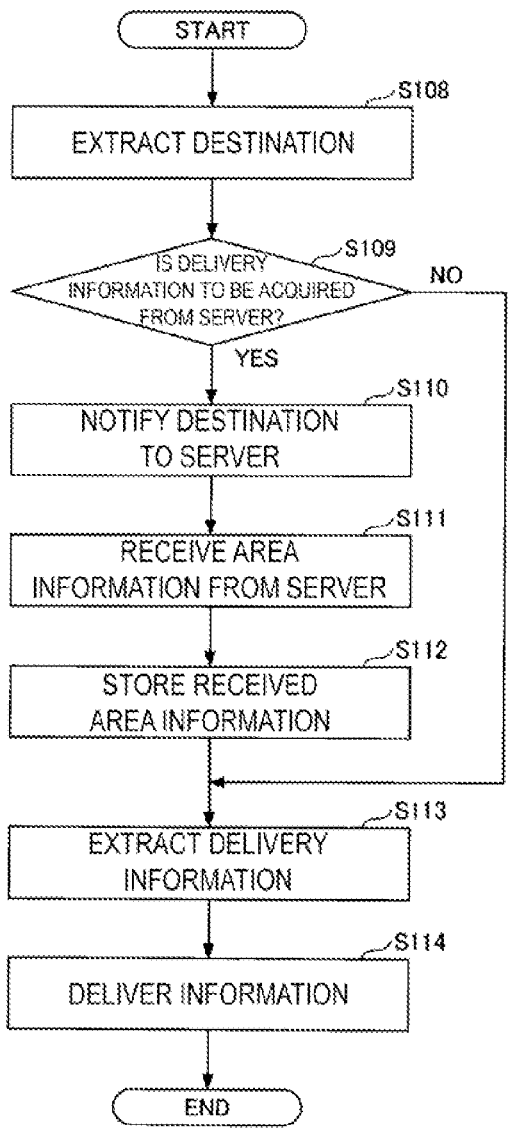
FIG. 8 is a flowchart illustrating information delivery processing according to the example of the present disclosure.

In step S108, the destination extraction function 122 extracts the area (movement path information) to which the device 20 moves next. Specifically, as illustrated in FIG. 8, in step S108, the destination extraction function 122 extracts the movement path information about the device 20 from the movement path information memory function 123.

In step S109, the information delivery function 135 determines whether to acquire delivery information from the application server 40. Specifically, the information delivery function 135 may check whether delivery information corresponding to the extracted destination is stored in the delivery information memory function 113, and when the delivery information corresponding to the extracted destination is not stored in the delivery information memory function 113, the information delivery function 135 may determine that it is necessary to acquire the delivery information corresponding to the destination from the application server 40. On the other hand, when the delivery information corresponding to the extracted destination is stored in the delivery information memory function 113, the information delivery function 135 may determine that it is unnecessary to acquire the delivery information corresponding to the destination from the application server 40.

Note that even when the delivery information corresponding to the extracted destination is stored in the delivery information memory function 113, the information delivery function 135 may acquire the delivery information corresponding to the destination from the application server 40 according to a load on the application server 40. That is, in consideration of the load on the application server 40, when the load on the application server 40 is high and, for example, is a predetermined load threshold or more, the information delivery function 135 may deliver the delivery information acquired or stored in advance. On the other hand, when the load on the application server 40 is not high and, for example, is less than the predetermined load threshold, the information delivery function 135 may newly acquire delivery information and deliver the acquired delivery information. This allows the newest area information to be delivered to the device 20 while considering the load on the application server 40.

Here, at a time when the destination of the device 20 is determined, the delivery information corresponding to the destination needs to be already acquired. Thus, prior to this time, the area information about the estimated destination is acquired and used at the present time. Thus, not only a next destination 1, but also a destination 2 next to the destination 1, and a destination 3 next to the destination 2 . . . may be estimated, and delivery information corresponding to the estimated destinations 2, 3 . . . may be acquired. In other words, several destinations may be estimated, and area information about the estimated destinations may be acquired in advance. In addition, the area information corresponding to each of such subsequent destinations may be acquired when a load on the application server 40 is low and, for example, is a predetermined load threshold or less.

When the delivery information corresponding to the destination is acquired from the application server 40 (S109: YES), the destination notification function 133 notifies the application server 40 of an area to which the device 20 moves next (movement path information) in step S110. Specifically, as illustrated in FIG. 8, in step S110, the destination notification function 133 notifies the application server 40 of the movement path information about the device 20. In contrast, when the delivery information corresponding to the destination is not acquired from the application server 40 (S109: NO), the processing proceeds to step S113.

Note that whether the delivery information management function unit 110 acquires and holds area information about a certain area in advance may be determined based on the number of devices that are present in the area. That is, when a large number of devices that requests the area information about the area is present (for example, when the number of the devices present in the area is a predetermined threshold or more or when the number of requests to acquire the area information is a predetermined threshold or more), notifying another mechanism such as the application server 40 each time to acquire the area information is inefficient as it increases communication and processing load for this signaling. Accordingly, in this case, it is deemed to be efficient for the delivery information reception function 134 to acquire the area information about the area in advance from a mechanism such as the application server 40, and for the information delivery function 135 to deliver the held area information to the device 20.

In contrast, when a large number of devices that requests area information about the area is not present (for example, when the number of the devices present in the area is less than a predetermined threshold or when the number of requests to acquire the area information is less than a predetermined threshold), holding the area information in the proactive delivery device 100 in advance is inefficient as it wastes storage capacity. Accordingly, in this case, the destination notification function 133 may notify the application server 40, and the like each time and acquire the area information without acquiring and holding the area information in advance.

In step S111, the delivery information reception function 134 acquires area information about a next area or one or more areas that follow the next area of the device 20 from a mechanism such as the application server 40 or the like. Specifically, as illustrated in FIG. 8, the delivery information reception function 134 acquires the area information about the next area or one or more areas that follow the next area from the application server 40, and passes the acquired area information to the delivery information storage function 112.

In step S112, the delivery information storage function 112 stores the received area information in the delivery information memory function 113. Specifically, as illustrated in FIG. 8, the delivery information storage function 112 stores the area information received from the delivery information reception function 134 in the delivery information memory function 113.

In step S113, the delivery information extraction function 111 extracts the area information about the destination of the device 20 from the delivery information memory function 113. Specifically, as illustrated in FIG. 8, the delivery information extraction function 111 extracts the area information about the destination of the device 20 from the delivery information memory function 113.

In step S114, the information delivery function 135 transmits the area information about the next area to the device 20. Specifically, as illustrated in FIG. 8, the information delivery function 135 delivers the area information about the destination to the device 20 that is present in the current area.

According to the proactive delivery device 100 described above, the area information about the destination can be delivered before the device 20 arrives at the destination. In addition, even when the movement path of the device 20 is unknown, the proactive delivery device 100 may estimate an area to which the device 20 moves next using the past movement history information, and deliver the area information about the estimated destination. The area information may also be held in the proactive delivery device 100 according to the number of devices, the number of deliveries, and the like, and be delivered to the device 20 without being acquired from the application server 40 each time. Alternatively, the area information may be acquired from the application server 40 each time and delivered to the device 20. In this manner, the user using the device 20 is able to acquire the area information about the destination before moving to the destination, and thus the information acquired by the user is made more valuable than in the case where the area information is acquired after the movement.

The example of the present disclosure has been described above in detail. However, the present disclosure is not limited to the specific embodiment described above, and can be subjected to various modifications and changes within the scope of the gist of the present disclosure described in the claims.

REFERENCE SIGNS LIST

10 Communication system
20 Device
30 Communication network
40 Application server
100 Proactive delivery device

The invention claimed is:

1. An information delivery apparatus comprising:
a delivery information management function unit that includes one or more processors and that is configured to manage area information to be delivered;
a destination management function unit that includes one or more processors and that is configured to manage a destination of a device; and
a communication function unit that includes one or more processors and that is configured to deliver the area information to the device,
wherein the destination management function unit is further configured to determine the destination of the device using movement information about the device,
wherein the communication function unit is further configured to deliver, to the device, the area information about the destination before the device moves to the destination
wherein the destination management function unit is configured to estimate the destination of the device using movement history information about the device, and
wherein the movement history information indicates an attribute of the device including (i) a type of the device and (ii) movement speed of the device.

2. The information delivery apparatus according to claim 1, wherein:
the movement history information indicates (i) one or more areas to which the device has moved and (ii) the attribute of the device; and
the destination management function unit is further configured to use a destination estimation model learned using the movement history information to estimate the destination of the device from the movement history information about the device.

3. The information delivery apparatus according to claim 1, wherein the delivery information management function unit is further configured to acquire and hold, based on a number of a plurality of devices in an area, area information about the area in advance.

4. The information delivery apparatus according to claim 3, wherein the delivery information management function unit is further configured to acquire and hold, based on the number of the plurality of devices in the area being greater than or equal to a predetermined threshold, the area information about the area in advance.

5. The information delivery apparatus according to claim 3, wherein the delivery information management function unit is further configured to acquire, based on the number of the plurality of devices in the area being less than a predetermined threshold, the area information about the area in advance.

6. The information delivery apparatus according to claim 1, wherein the destination management function unit is configured to, based on a movement path of the device being unknown, estimate the destination of the device using movement history information about the device.

7. The information delivery apparatus according to claim 1, wherein the destination management function unit is configured to, based on a movement path of the device being known, extract the destination of the device from movement path information.

8. The information delivery apparatus according to claim 7, wherein the destination management function unit is configured to receive, from the device, the movement path information.

9. The information delivery apparatus according to claim 1, wherein the destination management function unit is configured to, based on the device moving in a same traveling direction as a direction in which the device has entered a current area, estimate an area located ahead in the traveling direction as a next area.

10. An information delivery method comprising:
  determining, by a processor, a destination of a device using movement information about the device;
  extracting, by the processor, area information about the destination from area information to be delivered, the area information being stored in a memory;
  estimating, by the processor, the destination of the device using movement history information about the device; and
  delivering, by the processor, the extracted area information to the device before the device moves to the destination,
  wherein the movement history information indicates an attribute of the device including (i) a type of the device and (ii) movement speed of the device.

11. A non-transitory recording medium storing a program, wherein execution of the program causes one or more computers to perform operations comprising:
  determining, by a processor, a destination of a device using movement about information about the device;
  extracting, by the processor, area information about the destination from area information to be delivered, the area information being stored in a memory;
  estimating, by the processor, the destination of the device using movement history information about the device; and
  delivering, by the processor, the extracted area information to the device before the device moves to the destination,
  wherein the movement history information indicates an attribute of the device including (i) a type of the device and (ii) movement speed of the device.

12. The non-transitory recording medium according to claim 11, wherein the movement history information indicates (i) one or more areas to which the device has moved and (ii) the attribute of the device; and
  wherein estimating the destination of the device further comprises using a destination estimation model learned using the movement history information to estimate the destination of the device from the movement history information about the device.

13. The non-transitory recording medium according to claim 11, wherein the operations further comprise acquiring and holding, based on a number of a plurality of devices in an area, area information regarding the area in advance.

14. The recording medium according to claim 13, wherein acquiring and holding the area information comprises acquiring and holding, based on the number of the plurality of devices in the area being greater than or equal to a predetermined threshold, the area information about the area in advance.

15. The recording medium according to claim 13, wherein acquiring and holding the area information comprises acquiring, based on the number of the plurality of devices in the area being less than a predetermined threshold, the area information about the area in advance.

16. The recording medium according to claim 11, wherein estimating the destination comprises estimating, based on a movement path of the device being unknown, the destination of the device using movement history information about the device.

17. The recording medium according to claim 11, wherein estimating the destination comprises extracting, based on a movement path of the device being known, the destination of the device from movement path information.

18. The recording medium according to claim 17, wherein the operations further comprise receiving, from the device, the movement path information.

19. The recording medium according to claim 11, wherein the operations further comprise estimating, based on the device moving in a same traveling direction as a direction in which the device has entered a current area, an area located ahead in the traveling direction as a next area.

* * * * *